Patented Aug. 10, 1937

2,089,531

UNITED STATES PATENT OFFICE 2,089,531

TOOTH PASTE

Einar Bergve, Oslo, Norway, assignor to A/S Si-Ko, Oslo, Norway, a Norwegian corporation No Drawing. Application July 6, 1934, Serial No. 734,031. In Sweden July 12, 1933

8 Claims. (Cl. 167—93)

The present invention relates to a tooth paste which is principally characterized by the feature that it contains a magnesium salt, preferably a neutral salt, of one of the common fruit acids such as tartaric acid, malic acid or citric acid etc. as a cleansing agent, and has a pH value of 6.3–7.8, for example 7.0. The tooth paste according to the invention is preferably free from substances which spontaneously or in the presence of the magnesium salt give off $CO_2$. Other characteristic features of the tooth paste according to the invention will be set forth in the following description.

It is now believed to have been definitely established by the odontological science that a tooth paste should be free from soap and insoluble cleansing agents. The soap affects the gums, and the insoluble cleansing agents remain in the pockets of the gums and may bring about inflammation or increase the intensity of an existing inflammation. If, for special purposes, it is desired to produce a neutral, soluble tooth paste, a number of difficulties are met with. This is so because the ions of the cleansing agent should not be foreign to the milieu of the mouth. If this requirement is to be answered, one is practically reduced to the use of salts of the so called fruit acids. The neutral alkali salts of these acids are so readily soluble, however, that they cannot be used, since they are dissolved almost instantaneously and thus do not have any cleansing effect. On the other hand, the calcium salts, for instance, are so difficultly soluble as to be useless. I have found that magnesium salts of fruit acids, for instance tartaric acid, citric acid, malic acid and the like, and particularly the substantially neutral salts answer all requirements, and the present invention therefore relates to a tooth paste containing one or more of these salts as a cleansing agent.

It may be mentioned, for instance, that the neutral magnesium tartrate has a solubility of about 1 g. in 100 g. of water. Assuming that about 1 g. of paste be used on the brush and that the paste contains about 25% of magnesium tartrate, the whole quantity of cleansing agent may thus be dissolved in 25 cubic centimetres of water. During brushing, about 5 cubic centimetres of water are generally used in the mouth, and a quantity sufficient for the cleansing thus remains undissolved during the actual brushing. Any residues in the cavity of the mouth are subsequently readily dissolved in the alkaline saliva.

The tooth paste according to the present invention may furthermore be of the kind set forth in the Swedish Patent No. 69,077, or be produced according to the method set forth in the Swedish Patent No. 74,139. The tooth paste may contain organic substances as a carrier which have been ground into the colloidal state and simultaneously been given the necessary absorbing capacity with respect to the deposits on the teeth.

In addition to the said cleansing agent the paste may also contain other cleansing agents, such as an inorganic colloid, for instance silicic acid in the form of a glycero-gel. A salt may also be added to the cleansing agent. If grinding into the colloidal state is employed in the manufacture of the tooth paste, such grinding may, as stated in the Swedish Patent No. 74,139, take place at an elevated temperature. If a moderately high temperature is preferred, the grinding may also be effected in an atmosphere which is soluble in the tooth paste, for instance in an atmosphere of carbon dioxide. Upon grinding, the mass coagulates while being slowly stirred, and this may be carried out if desired in an atmosphere of the kind set forth above.

Magnesium salts may be present in the paste in a quantity of for instance 10–40%; I prefer to employ about 20–30% of such a salt or a mixture of such salts.

The following examples of tooth pastes according to the present invention are given as illustrative.

(1) Colloidal silicic acid (hydro-gel) with about 12% $SiO_2$, for example, is admixed with such a quantity of glycerine that about equal parts of water and glycerine are obtained in the gel. If desired, part of the water is then evaporated. From this hydro-glycero-gel a paste is now produced in known manner with about 70% hydro-glycero-gel and about 25% magnesium tartrate. The remaining 5% may be made up of boric acid, having for its object to make the paste soft, and of neutral salts, such as Seignette-salt and some sodium chloride to make the paste firm and palatable. The paste may also be admixed with some percentage of foaming agents for the purpose of reducing the surface tension.

(2) To colloidal silicic acid containing 10–15% $SiO_2$, enough glycerine is added to produce a gel containing about 30–50% water. About 10–15% of the water may be then evaporated at 60–95° C. About 70% of this basic mass is used in the tooth paste, together with about 20% magnesium tartrate and other materials according to the requirements, such as about 5% potassium chlorate, borax, boric acid, chlorides, phosphates and rhodanates.

The term "fruit acids" as used in the specification and claims, is used to include organic acids naturally occurring in any of the common fruits.

What I claim is:—

1. A dentifrice containing as a cleansing agent a magnesium salt of a fruit acid.

2. A dentifrice containing as a cleansing agent a magnesium salt of a fruit acid, said dentifrice having a pH value of between 6.3 and 7.8.

3. A dentifrice containing as a cleansing agent a magnesium salt of a fruit acid and being free from substances which give off $CO_2$ in the presence of the magnesium salt employed.

4. A dentifrice containing between 10 and 40% of a magnesium salt of a fruit acid.

5. A dentifrice containing between 20 and 30% of a magnesium salt of a fruit acid.

6. A tooth paste comprising a carrier having an adsorbent capacity with respect to the deposits on the teeth, and a cleansing agent in the form of a magnesium salt of a fruit acid.

7. A tooth paste comprising silicic acid in the form of a glycero-gel as a carrier and a magnesium salt of a fruit acid as a cleansing agent.

8. A tooth paste comprising about 70% of silicic acid in the form of a glycero-gel, about 20% magnesium tartrate, and about 5% of a softening agent.

EINAR BERGVE.